United States Patent [19]

Toeda

[11] Patent Number: 4,714,062
[45] Date of Patent: Dec. 22, 1987

[54] SUB-COMBUSTION CHAMBER OF AN INTERNAL COMBUSTION ENGINE
[75] Inventor: Shigetoshi Toeda, Kokubu, Japan
[73] Assignee: Kyocera Corporation, Kyoto, Japan
[21] Appl. No.: 870,294
[22] Filed: May 21, 1986

Related U.S. Application Data
[63] Continuation of Ser. No. 603,231, Apr. 23, 1984, abandoned.

[30] Foreign Application Priority Data
Apr. 27, 1983 [JP] Japan .................................. 58-75648
[51] Int. Cl.4 .............................................. F02B 3/00
[52] U.S. Cl. .................... 123/273; 123/283; 123/270
[58] Field of Search ............... 123/252, 255, 256, 266, 123/273, 286

[56] References Cited
U.S. PATENT DOCUMENTS
2,003,311  6/1935  Ricardo ............................. 123/284
2,018,727 10/1935  Kibbe .................................. 123/286
2,865,346 12/1958  Liebel .................................. 123/271
4,325,334  4/1982  Nishida et al. .................... 123/286
4,340,019  7/1982  Barnert et al. .................... 123/256
4,426,966  1/1984  Huther et al. ..................... 123/270

FOREIGN PATENT DOCUMENTS
0146228 11/1980  Japan ................................. 123/286
0033859 12/1933  Netherlands ..................... 123/273
0151899 10/1920  United Kingdom ............. 123/273

Primary Examiner—Parshotam S. Lall
Attorney, Agent, or Firm—Spensley Horn Jubas & Lubitz

[57] ABSTRACT

This invention relates to a sub-combustion chamber of an internal combustion engine, which includes a ceramic hot plug in a hot plug installation hole in a cylinder head, wherein a small clearance is provided between the hot plug and the installation hole to ensure better heat insulation and thus to greatly improve starting performance, combustion efficiency and reliability of the engine. This invention also relates to a sub-combustion chamber, wherein the hot plug can be easily inserted and secured in the hot plug installation hole.

8 Claims, 9 Drawing Figures (A)     (B)

SUB-COMBUSTION CHAMBER OF AN INTERNAL COMBUSTION ENGINE

This is a continuation of application Ser. No. 06/603,231 filed on Apr. 23, 1984, now abandoned.

BACKGROUND OF THE INVENTION

1. Field of the Invention

This invention relates to a sub-combustion chamber of an internal combustion engine having a hot plug.

2. Prior Art

Two combustion methods have been used for diesel engines, a kind of internal combustion engines. One method is the direct injection method which directly injects fuel into a single main combustion chamber.

The other method is the sub-combustion chamber method which injects fuel into a precombustion chamber (turbulence chamber) to achieve partial combustion (transient combustion). Recently, diesel engines have become more compact and have had higher speed.

Accordingly, many sub-combustion chamber type engines are used to complete combustion in a short time. However, this kind of a sub-combustion type diesel engine is greatly cooled, since a sub-combustion chamber F is provided in a cylinder head H which has a cooling water passage W as shown by the vertical sectional view in FIG. 1.

As a result, the temperature of compressed air does not rise sufficiently and it is extremely difficult to start the engine especially during a cold season. To solve this problem, a glow plug G is used as a heating means to quicken ignition and to improve starting performance. However, the fuel injected from an injection nozzle N is not completely atomized in the early stage of starting, the area near the sub-combustion chamber F is not sufficiently heated, and the cylinder head H including the sub-combustion chamber and the hot plug P which is a member of the sub-combustion chamber are made of heat-resistant alloys with relatively high thermal conductivity.

As a result of the combination of these factors, the total cooling area is large, turbulence in the sub-combustion chamber F is violent, and thermal loss becomes great. Therefore, a considerably long time is required until the temperature near the sub-combustion chamber rises to the extent that injected fuel does not cause ignition lag. Thus knocking occurs due to the ignition lag, resulting in generation of noise and malfunction of the engine.

To cope with the above-mentioned defects, it is required to quickly raise the temperature of the sub-combustion chamber F. For this purpose, the temperature of a hot plug P in the sub-combustion temperature of a hot plug P in the sub-combustion chamber should be raised quickly, and the thermal conductance from the hot plug P to the cylinder head H which has the cooling water passage W should be as small as possible. The examples of sub-combustion chambers to solve these problems are shown in FIGS. 2 and 3, wherein the outer diameter of the hot plug P is slightly smaller than the diameter of the hot plug installation hole Ha so that a small clearance L for heat insulation is provided between the circumferential surface of the metal hot plug P and the inner wall surface of a hot plug installation hole Ha (except the flange section Pb described below), and the flange section Pb integrated in the lower section of the hot plug P is pressure-fit in the larger diameter section Hb of the hot plug installation hole Ha and is secured in the cylinder head to form the sub-combustion chamber. However, the metallic hot plug P is always exposed to high-temperature flames during engine operation.

Although the plug is generally made of a heat-resistant material, it is not durable enough to cope with the heat. Especially, the edge E of the plug facing the main combustion chamber may be easily burnt.

In addition, the plug is expensive since it is made of a heat-resistant alloy including nickel and cobalt. Considering these situations, various hot plugs made of ceramic materials, whose thermal conductivity is lower than that of metal materials and which have superior heat resistance, have been proposed.

However, ceramic materials are relatively suceptible to thermal and mechanical impacts although they have high heat resistance. When a ceramic hot-plug is used, it cannot be directly pressure-fit into the cylinder head, unlike metallic hot plugs. Moreover, if a ceramic hot plug is installed where a great thermal gradient is caused during engine operation, the ceramic hot plug may be cracked or chipped off due to thermal stress.

Although various proposals have been offered to solve these problems, significantly effective means have not yet been developed.

SUMMARY OF THE INVENTION

It is therefore an object of the present invention to provide a sub-combustion chamber including a ceramic hot plug, which is also to solve the above-mentioned problems and to fully utilize its effective characteristics.

The advantages of the present invention will become more apparent when preferred embodiments are considered in connection with the drawings.

BRIEF DESCRIPTION OF THE DRAWINGS

FIG. 8 (B) is a view similar to FIG. 8 (A) illustrating the other embodiment of the present invention.

In the following description, like numerals refer to like parts.

Referring to FIG. 4, a cooling water passage W and a sub-combustion chamber F are provided in a cylinder head H, and a fuel injection nozzle N and a glow plug G for improving starting performance are also provided at the proper positions in the cylinder head.

A ceramic hot plug Pc is inserted and secured in a hot plug installation hole J in the cylinder head H so that the plug occupies a half of the space volume of the sub-combustion chamber. In this configuration, the diameter of the hot plug installation hole J is slightly larger than the outer diameter of the hot plug Pc to provide a small clearance L between the external circumferential surface of the hot plug Pc and the internal wall surface of the hot plug installation hole J. An elastic ring, or washer ring S with a C or S-shaped section is placed between the upper end of the hot plug Pc and the upper end wall step J1 of the hot plug installation hole J to ensure sealing and shock absorption.

Figure 1:
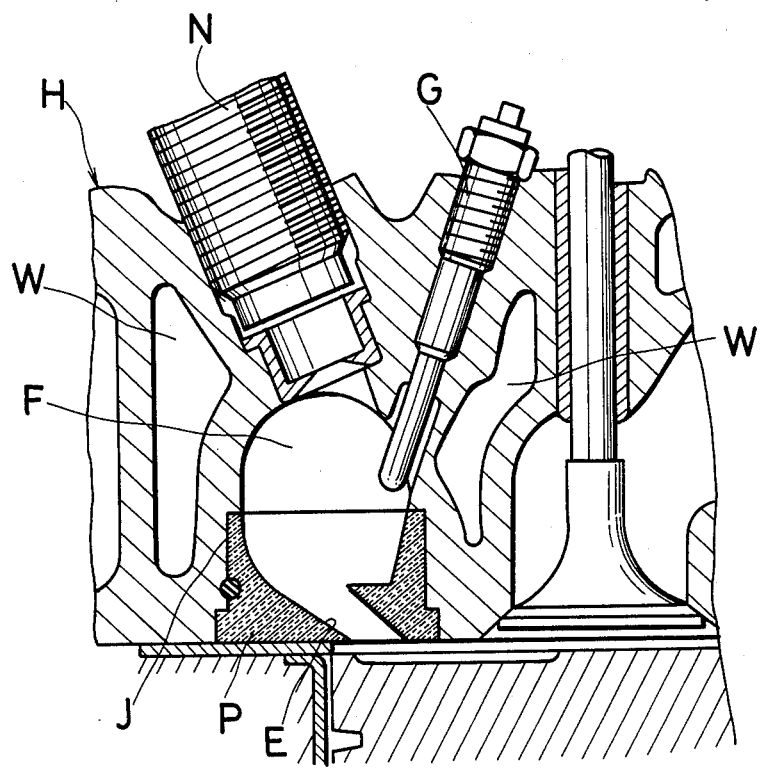
FIGS. 1, 2 and 3 are vertical sectional views of the sub-combustion of conventional internal combustion engines.
Figure 2:
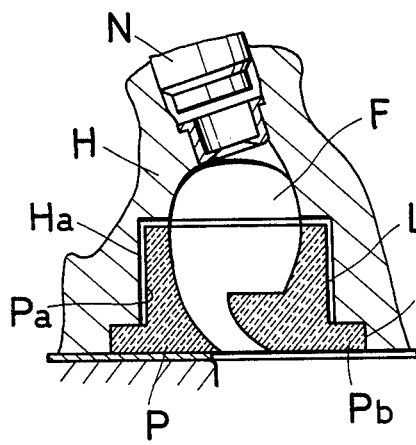
Figure 3:
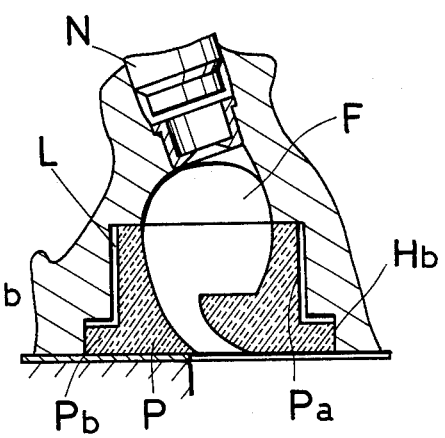
Figure 4:
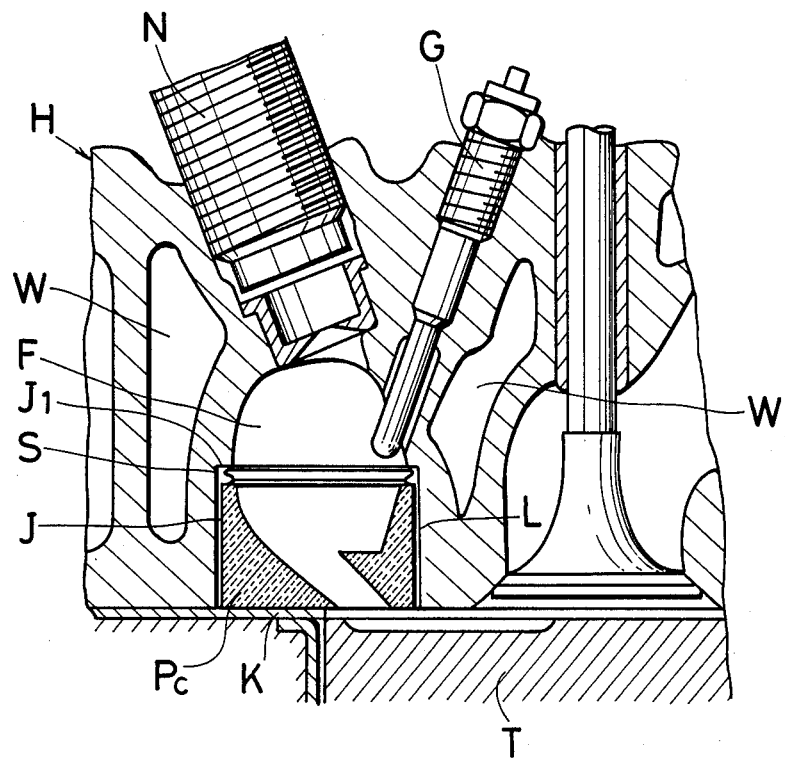
FIGS. 4 and 5 are vertical section views illustrating the constructions of the sub-combustion chambers of embodiments of the present invention.
Figure 5:
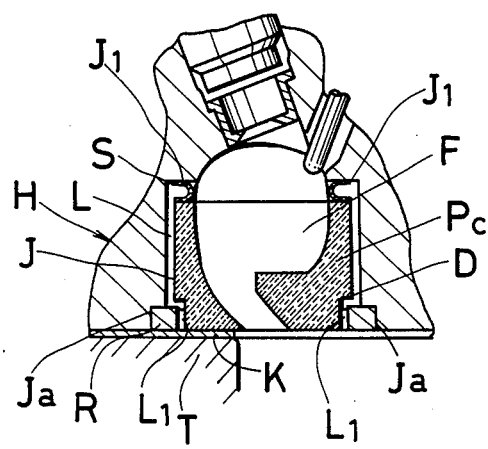
Figure 6:
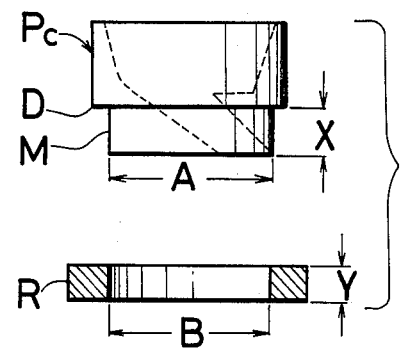
FIG. 6 illustrates the size relationship between the hot plug Pc and the metal ring R of an embodiment of the present invention.

Accordingly, the hot plug Pc can easily installed in the cylinder head H as shown in FIG. 4 by inserting the plug into the hot plug installation hole J by hand. After the cylinder head H has been mounted on a cylinder body T, the hot plug Pc in the hot plug installation hole J is held between the washer ring S and a gasket member K at the bottom. In the case of the embodiment shown in FIG. 4, when the cylinder head H in which the hot plug Pc has been inserted in the hot plug installation hole J is mounted to assemble an engine, the hot plug Pc easily drops from the installation hole J, since the plug does not yet contact the gasket member K. This makes the engine assembly process difficult. To prevent the dropping of the hot plug Pc from the hot plug installation hole J, a contracted step section D is formed at the lower circumferential section of the hot plug Pc as shown in the embodiment in FIG. 5 and a larger diameter section Ja is formed at the bottom opening section of the hot plug installation hole J so that the metal ring R is fit in the larger diameter section Ja and the bottom end of the hot plug Pc contacts the metal ring R. Therefore, it is preferable to use this drop prevention method for convenient engine assembly. Even in this case, the hot plug Pc is also held between the washer ring S at the top and the gasket K at the bottom. Therefore, the outer diameter A of the smaller diameter section M forming the contracted step section D of the hot plug Pc should be smaller than the inner diameter B of the metallic ring R, and the length X of the smaller diameter section M should be larger than the height Y of the metallic ring R. When the hot plug Pc is held at the bottom by the gasket member K, a small clearance L1 is provided between the hot plug Pc and the metallic ring R.

The hot plug Pc, which is installed in the cylinder head and comprises a part of the sub-combustion chamber F as described above, should be made of a ceramic material with superior heat resistance and heat insulation, more preferably silicon nitride ($Si_3N_4$) or Sialon ($Si_{6-x}Al_2N_{8-z}O_z$) which is also superior in thermal impact resistance. As clearly illustrated in FIGS. 4 and 5 which show the constructions of the sub-combustion chambers F of the present invention, a clearance L is provided, since the outer diameter of the hot plug Pc is smaller than the inner diameter of the hot plug installation hole J. In addition, small clearances L and L1 of 0.01 to 0.5 mm are provided between the external circumferential surface of the hot plug Pc and the internal circumferential surface of the hot plug installation hole J and between the external circumferential surface of the hot plug Pc and the internal circumferential surface of the metal ring R, since the metal ring R, whose inner diameter is slightly larger than the smaller diameter section M which forms the contracted step section D, is placed below the hot plug Pc and the hot plug Pc is raised by the gasket member K.

Figure 7:
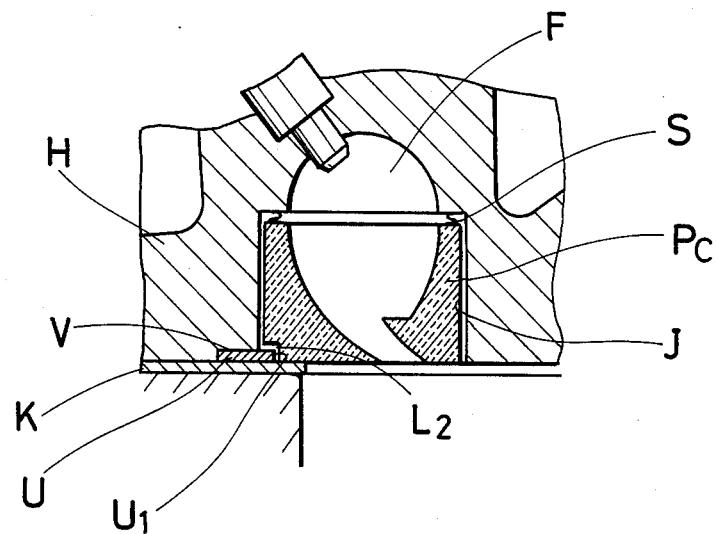
FIG. 7 is a view similar to FIG. 5 illustrating another embodiment of the present invention.
Figure 8:
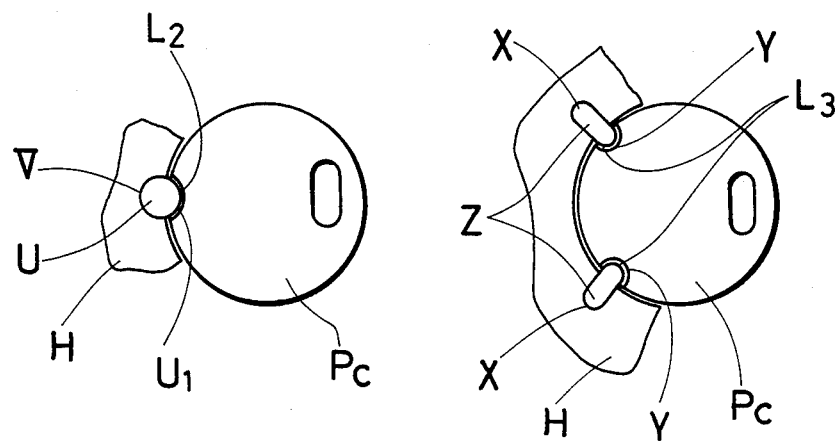
FIG. 8 (A) is a partial view illustrating the relationship between the bottom surface of the hot plug and the surrounding members of the embodiment shown in FIG. 7.

In the above description, the metallic ring R is used to prevent the hot plug Pc from dropping. Instead of this metal ring R, circular and cocoon-shaped metal pieces can also be provided in the circumferential direction of the hot plug Pc. These metal pieces are shown in FIGS. 7, 8 (A) and 8 (B). One circular metal piece U shown in FIG. 7 is provided in the circumferential direction of the hot plug Pc as shown in FIG. 8 (A). A partially circular notch V with a radius slightly smaller than that of the metal piece U is formed at the lower end opening section of the hot plug installation hole J. The hot plug Pc has a partially circular notch U1 with a radius slightly larger than that of the metal piece U at the section engaging with the metal piece U. The metal piece U is pressure-fit and secured in the notch V.

In this condition, a small clearance L2 is provided between the metal piece U and the notch U1. In the embodiment shown in FIG. 8 (B), plural cocoon-shaped metal pieces Z are provided. A notch X which is slightly smaller than the partial external form of the cocoon-shaped metal piece Z is formed at the lower end opening section of the hot plug installation hole J. One notch is formed for each metal piece Z. The metal piece Z is pressure-fit and secured in the notch X. In addition, a notch Y which is slightly larger than the partial external form of the metal piece Z projecting from the notch X is provided at the section engaging with the metal piece Z. In this condition, a small clearance L3 is provided between the notch Y and the metal piece Z. It is clearly understood that the metal pieces U and Z of these embodiments function to prevent th hot plug Pc from dropping and the small clearances L2 and L3 ensure heat insulation between the hot plug Pc and the cylinder head H in the same way as described for the first embodiment of the present invention.

The hot plug Pc is installed in the cylinder head H and comprises a part of the sub-combustion chamber F as described above, and the hot plug Pc itself is made of a substance with small heat conductance, thus it can maintain high temperature during engine operation, especially engine starting.

Accordingly, the temperature of the sub-combustion chamber F is quickly raised, thus the starting performance is improved and the engine operation becomes stable in a short period. In addition, the hot plug Pc does not directly contact the cylinder head H, but only contacts the washer ring S at the top and the gasket member K at the bottom, since the small clearance L is provided. Therefore, thermal conductance from the hot plug Pc to the cylinder head H, which has a lower temperature, is minimal. Thus, this construction is greatly helpful for raising the temperature of the hot plug Pc. Furthermore, when the engine is continuously operated and the cylinder head H is heated at a high temperature, the expansion amount due to heat is accommodated by the small clearance L, thus compression stress due to thermal expansion is not applied to the hot plug Pc. Moreover, the expansion amount of the hot plug Pc in the axial direction is accommodated by the contraction of the washer ring S.

As described above, the sub-combustion chamber of the present invention includes a ceramic hot plug which is superior in heat resistance, thermal impact resistance and heat insulation, and the hot plug does not directly contact the cylinder head. Thus thermal stress caused by high temperature and external forces caused by thermal deformation of the cylinder head are not applied to the hot plug.

Consequently, the sub-combustion chamber can deliver stable performance without fear of cracking and chipping off. As a result, the effects of the subcombustion chamber of the present invention is extremely significant in improving the starting performance, combustion efficiency and reliability of the engine.

What is claimed is:

1. In a cylinder head in an internal combustion engine having a cylinder body to which the cylinder head is installed, with a gasket placed therebetween, the cylinder head including a pre-combustion chamber having a cylindrical portion for receiving a ceramic hot plug; and a ceramic hot plug disposed in said cylindrical portion of said pre-combustion chamber; the improvement comprising:

an annular shoulder in said pre-combustion chamber, said annular shoulder defining the upper end of said cylindrical portion of said pre-combustion chamber;

an annular elastic member disposed between said annular shoulder and the upper end of said ceramic hot plug and compressed therebetween;

the ceramic hot plug being shaped to conform to the cylindrical portion of the pre-combustion chamber so that a small clearance is provided between the ceramic hot plug and the peripheral wall of said pre-combustion chamber; and means for preventing said ceramic hot plug from dropping out of said cylindrical portion of said pre-combustion chamber prior to installation of the cylinder head on the cylinder body, wherein said means contacts said ceramic hot plug prior to installation of the cylinder head and, after installation of said cylinder head, the ceramic hot plug is urged toward the upper end of said cylindrical portion of the pre-combustion chamber so that a clearance is provided between said means and said ceramic hot plug and said ceramic hot plug is held between said elastic member and the gasket member disposed between said cylinder head and said cylinder body.

2. The combination according to claim 1 wherein said means for preventing said ceramic hot plug from dropping out of said cylindrical portion of said pre-combustion chamber prior to the installation of said cylinder head on said cylinder body includes a downwardly facing annular shoulder on said ceramic hot plug, and an annular ring having an internal diameter which is less than the outer diameter of the ceramic hot plug; said annular ring being mounted in said cylinder head so as to extend radially inwardly into the lower portion of the cylindrical portion of said pre-combustion chamber.

3. The combination as claimed in claim 1 further having at least one cocoon-shaped metal piece located in said cylinder head and extending from the peripheral wall of the pre-combustion chamber so as to contact a lower section of the hot plug and to prevent said hot plug from dropping downwards cylinder head is installed on said cylinder body, and such that, after said cylinder head is installed on said cylinder body, a small clearance is provided between said hot plug and said cocoon-shaped metal piece.

4. The combination as claimed in claim 1 further having at least one planar, circular metal piece located in said cylinder head and extending from the peripheral wall of the pre-combustion chamber so as to contact a lower section of the hot plug and to prevent said hot plug from dropping downwards before said cylinder head is installed on said cylinder body, and such that, after said cylinder head is installed on said cylinder body, a small clearance is provided between said hot plug and said planar, circular metal piece.

5. The combination as claimed in any of claims 1, 2, 3, and 4, wherein said hot plug comprises a ceramic material having superior heat resistance, such as silicon nitride or sialon.

6. The combination as claimed in any of claims 1, 2, 3, and 4, wherein said small clearance has a distance range of 0.01 to 0.5 mm.

7. A cylinder head including a pre-combustion chamber with a cylindrical portion and having a ceramic hot plug disposed in the cylindrical portion of the pre-combustion chamber, the cylinder head being placed on a cylinder body of an internal combustion engine with a gasket member therebetween, the combustion further including:

an annular shoulder in the pre-combustion chamber defining the upper end of the cylindrical portion of the pre-combustion chamber;

an annular elastic member disposed between the annular shoulder and the upper end of the ceramic hot plug and compressed therebetween; and the ceramic hot plug being shaped so as to conform to the cylindrical portion of the pre-combustion chamber so that a small clearance is provided between the ceramic hot plug and the peripheral wall of the pre-combustion chamber;

wherein the ceramic hot plug is held in the pre-combustion chamber between the annular elastic member and the gasket member without coming into contact with the cylinder head or cylinder body 8. The combination of claim 7 further including means for retaining the ceramic hot plug in the pre-combustion chamber and for enabling the ceramic hot plug to be moved further into the pre-combustion chamber away from said means, whereby prior to placement of the cylinder head on the cylinder body said means prevents the ceramic hot plug from falling out of the pre-combustion chamber and after placement of the cylinder head on the cylinder body the hot plug is urged away from said means and further into the pre-combustion chamber so as to provide a clearance between said means and said ceramic hot plug.

* * * * *